May 6, 1930. D. J. McCARTHY 1,756,948
MOUNT FOR FOCUS FINDERS IN SIGNAL LAMPS
Filed Nov. 14, 1927
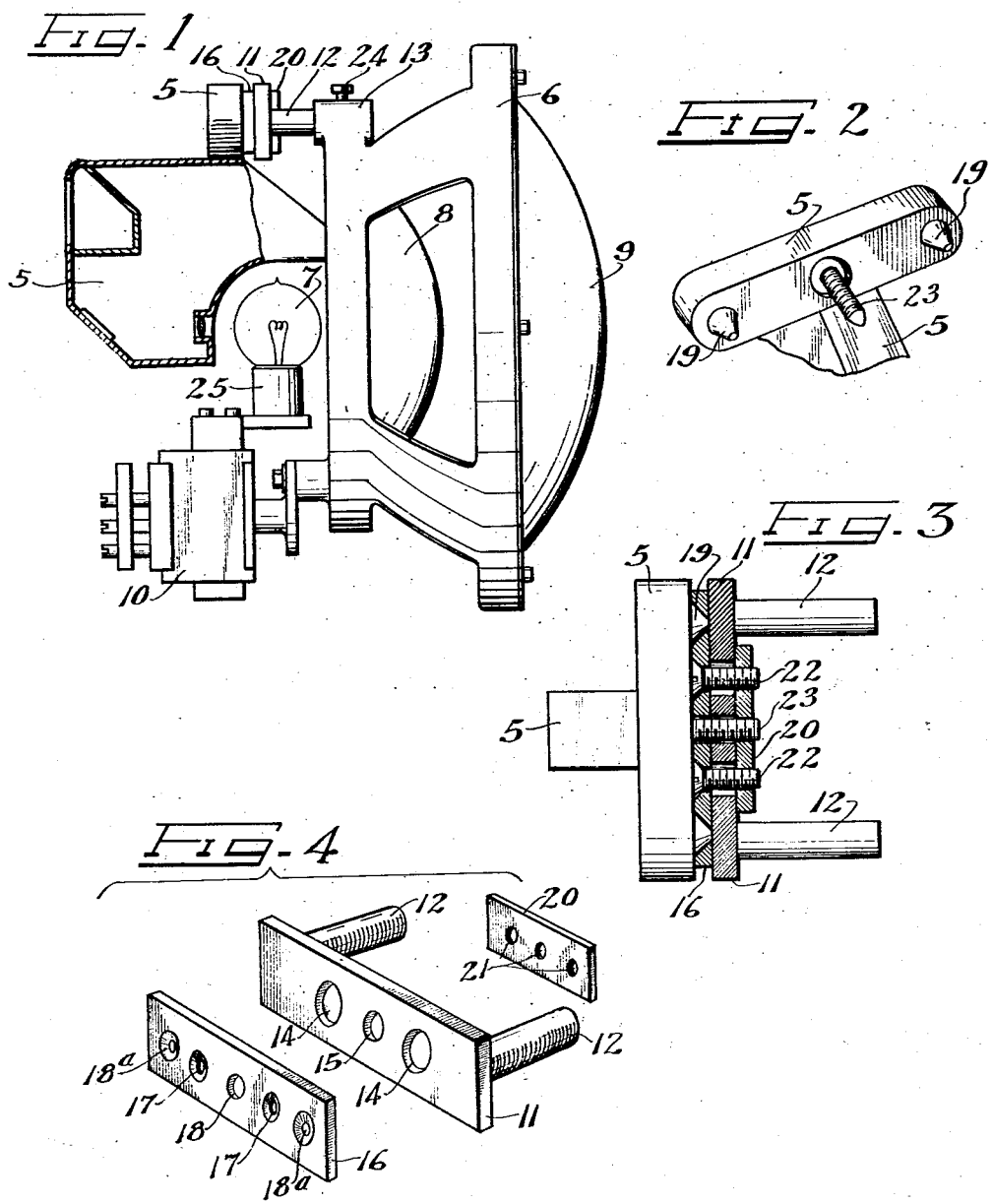
Inventor
Daniel J. McCarthy
By Charles... Atty.

Patented May 6, 1930

1,756,948

UNITED STATES PATENT OFFICE

DANIEL J. McCARTHY, OF ELGIN, ILLINOIS, ASSIGNOR TO CHICAGO RAILWAY SIGNAL & SUPPLY COMPANY, OF CARPENTERSVILLE, ILLINOIS, A CORPORATION OF ILLINOIS

MOUNT FOR FOCUS FINDERS IN SIGNAL LAMPS

Application filed November 14, 1927. Serial No. 232,981.

The invention will be explained as applied to signal lamps wherein it is utilized for correctly positioning a focus finder upon a signal lamp unit with which the mount becomes a permanent part, whereby to correctly determine the position of a source of light, or incandescent lamp, relatively to the focus of a signal lamp lens or lens combination.

In my Patent No. 1,563,510, granted December 1, 1925, I have disclosed a mount for a focus finder and have shown one means or mount for attaching the aforesaid finder to the unit lamp.

The instant invention is concerned solely with a mount by means of which the finder may invariably be placed and located in a very definite position with respect to the focus of the lens or doublet lens of the unit.

One of the objects of the invention is to improve the construction of mounts, upon which temporarily applied focus finding devices may be supported, invariably in the same location with respect to the focus point of a lens, or reflector, of a signal light unit.

Other objects, advantages and benefits of my invention will readily occur to persons skilled in the art, from a consideration of the following description when taken with the accompanying drawings, forming a part hereof, wherein:

Figure 1 is a side elevation of a signal unit with a focus finder mounted thereon.

Figure 2 is a perspective view of a part of the focus finder having elements of the improved mount herein disclosed.

Figure 3 is a section of parts of the mount, assembled.

Figure 4 is a perspective view of parts of the mount, separated and in position for assembling. In all of the views the same reference characters are employed to indicate similar parts.

The focus finder 5 is separable from the lamp unit 6 and may be used for determining the correct location of the lamp 7 with respect to the axial focus of the lens 8 and 9, or either of them, in this and other lamp units.

The mechanism 10, is means for changing the positions of the lamp 7 and for fixing it in selectde position, which position is to be determined by the focus finder 5.

This mechanism 10 is fully described and claimed in my copending application, Serial No. 232,980 filed of even date herewith.

The parts of the mount to be permanently attached to the lamp unit and to become an inseparable part thereof are individually shown in Figure 4 and as assembled in Figure 3.

A plate 11 has two spaced, parallel studs 12—12 which are to enter suitable perforations in a pair of perforated, spaced ears 13—13 extending from the unit 6, only one said ear being shown. The plate 11 has three relatively large perforations 14—14 and a central perforation 15.

A plate 16 has three holes or perforations 17—17 and 18 which are smaller than the holes 14—14 and 15 in plate 11, but they axially register therewith.

Plate 16 also has two tapered depressions or counter sunk holes 18$^a$—18$^a$. The finder 5 has two tapered, projecting studs 19—19 which exactly register with the depressions 18$^a$—18$^a$. A screw plate 20 has three spaced, threaded holes 21—21—21. These holes register with holes 14—15—17 and 18, respectively. Screws 22—22 pass through plates 11 and 16 and into the outer threaded holes 21—21 in plate 20. The center screw 23, passes through a part of the finder 5, as shown in Figure 2. This center screw holds the finder on the mount.

In the use and operation of the device the mount parts loosely assembled, as shown in Figure 3, are attached to unit 6 by entering the studs 12—12 into the reamed openings in the ears 13—13. The studs may be temporarily fixed by use of the set screws 24—24.

The finder 5 is now placed on the mount with the tapered studs 19—19 entered in depressions 18$^a$—18$^a$ in plate 16 of the mount. Screw 23 is now slightly tightened.

As the holes 14—14—15 are considerably larger in diameter than the respective screws 22—22—23, the plate 16 with the finder 5, attached thereto and the screw plate 20 may be shifted in any direction until the finder 5 locates lamp 7, with its filament at the focal point of the lens doublet.

The lamp 7 may be moved to the location determined by the finder 5, by means of the mechanism 10.

The finder is now removed from the mount, without disturbing the positions of the parts and screws 22—22 are rotated to clamp plates 11, 16, and 20, into firm immovable contact.

The focus finder is now replaced and screw 23 is tightened thus holding the finder in true position. The studs 19 when they enter depressions 18ª—18ª bring the finder into true register and correct position. The finder 5 and the mount may be shifted fore and aft, and the studs 12—12, until the image in the finder indicates when the proper position has been found, whereupon set screws 24 are tightened and thereupon dowel pins may be driven through the ears 13 and studs 12 to make the ascertained position permanent.

When a new lamp has been placed in the lamp holder 25, it may be moved by the adjusting device 10 to any point within the range of said device, and the finder 5 being replaced in the mount will clearly indicate when the filament of the substituted lamp is at the focal point of the lenses.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. A mount for a focus finder, on a lamp unit, a plate, plate supporting means on the unit, means on the plate registering in the plate supporting means to permit fore and aft motion of the plate and arranged at the same line to prevent lateral motion thereof, a plate, means permitting the shifting of the second plate on the first named plate to selected position thereon, means to lock said plates together when said position has been found, a focus finder, registering means between said finder and said shiftable plate, and means to secure said finder on said shiftable plate.

2. A mount for a focus finder, on a lamp unit, a plate having a pair of rearwardly extending parallel studs, apertured supports on the unit to receive the parallel studs to support the plate and permit fore and aft motion of the plate and at the same time to prevent lateral motion thereof, a plate, means permitting the shifting of the second plate on the first named plate to selected position thereon, means to lock said plates together when said position has been found, a focus finder, registering means between said finder and said shiftable plate, and means to secure said finder on said shiftable plate.

3. A mount for a focus finder, on a lamp unit, a plate, plate supporting means on the unit, means on the plate registering in the plate supporting means to permit fore and aft motion of the plate and arranged at the same time to prevent lateral motion thereof, a plate, means permitting the shifting of the second plate on the first named plate to selected position thereon, the shiftable plate having depressions formed therein, means to lock said plates together when said position has been found, a focus finder having a pair of tapering studs projecting therefrom to register in the depressions in the shiftable plate, and means to secure said finder on said shiftable plate.

In testimony whereof I have hereunto subscribed my name.

DANIEL J. McCARTHY.